Dec. 14, 1971 — E. MARE — 3,626,667
SCRUBBING METHOD AND APPARATUS
Filed Jan. 6, 1970
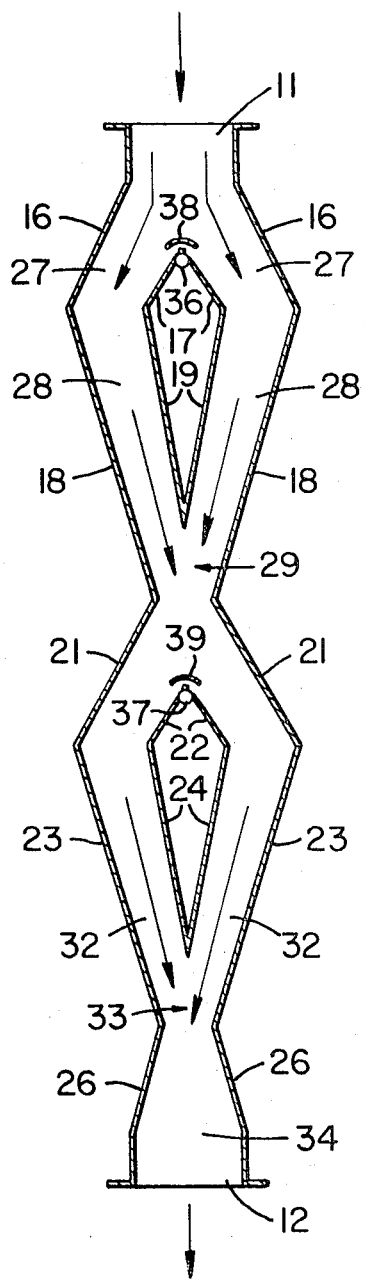
FIG_2
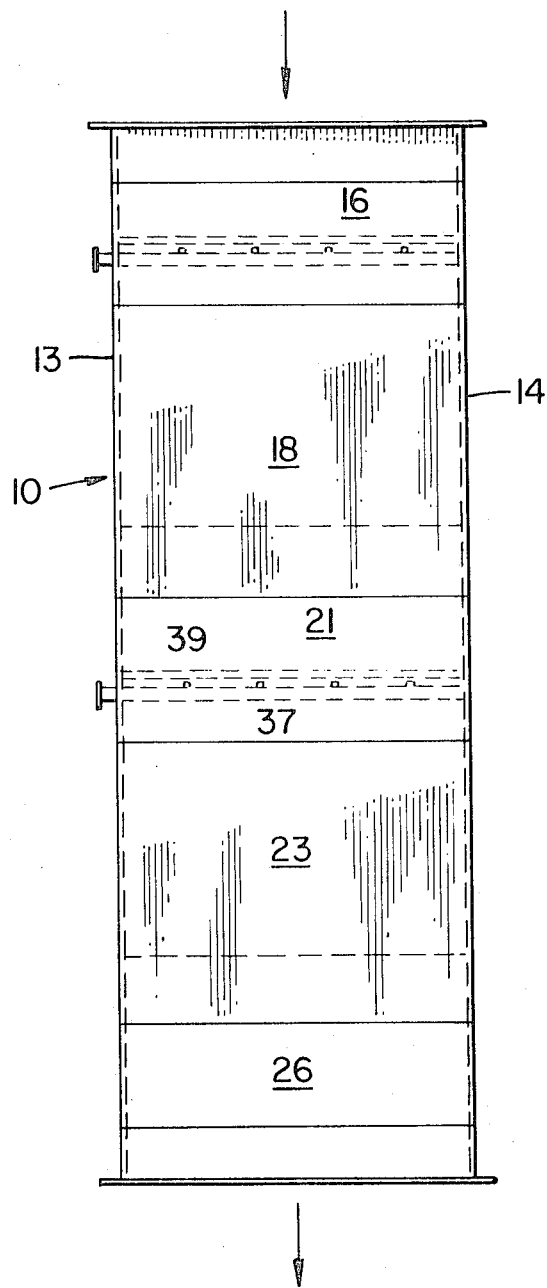
FIG_1
INVENTOR.
ERNEST MARE
BY Flehr, Hohbach, Test, Albritton & Herbert
ATTORNEYS United States Patent Office 3,626,667
Patented Dec. 14, 1971

3,626,667
SCRUBBING METHOD AND APPARATUS
Ernest Mare, Johannesburg, Transvaal, Republic of South Africa, assignor to J. Ronald Hershberger, Palo Alto, Calif.
Filed Jan. 6, 1970, Ser. No. 869
Int. Cl. B01d 47/06
U.S. Cl. 55—95
3 Claims

ABSTRACT OF THE DISCLOSURE

Gas scrubbing method and apparatus usable where it is desired to obtain intermixing of liquid droplets and a gas. For example, it may be used for gas scrubbing, blending, quenching, absorption, heat exchange, chemical reactions and the like. A gas stream to be treated is split into at least two separate streams which are first diverging and then caused to converge. The two streams are then brought together in a turbulent mixing zone. The scrubbing liquor is introduced into the two streams before they are intermingled whereby the liquor is thoroughly intermixed with the gas in the turbulent mixing zone. The flow paths leading to the zone of mixing are of decreasing cross sectional flow area to provide increasing flow velocities. Generally it is desirable to employ two or more such scrubbing stages. The equipment employs casing means which forms ducts for the flow paths and which has a means for introducing the scrubbing liquor.

BACKGROUND OF THE INVENTION

In the past so called gas scrubbers have been used for a variety of purposes, including the treatment of air or other gas to remove dust or other entrained solid particles. Conventional scrubbers are of various types. In one type the gas is passed through a treatment chamber where it is repeatedly contacted with the films or cascading streams of liquor, whereby the solid particles contact and become entrained in the liquor. This type of equipment is large for its capacity and is relatively inefficient. More modern scrubbers break up the scrubbing liquor into droplets which are entrained and intermixed with the gas to contact and wet the solid particles. One example is apparatus having means for spraying water or other liquor into a stream of the gas, with the gas subsequently passing through a series a baffles or louvers. Another example is apparatus having a screen or grid through which the gas is directed while a spray of water or other liquor is directed against the inlet side of the screen. While such apparatus is more efficient and compact than the type first described they likewise fail to provide the scrubbing efficiency desired in many instances, and they are relatively bulky compared to the present invention. In addition the pressure drop across such equipment is frequently quite substantial, and this is reflected in the power requirement and cost of operation.

SUMMARY OF THE INVENTION AND OBJECTS

This invention relates generally to gas scrubbing methods and apparatus for carrying out the same.

In general it is an object of the invention to provide a gas scrubbing method and apaparatus which is relatively efficient compared to prior methods and apparatus, and which is relatively compact for a given operating capacity.

Another object is to provide a scrubbing method and apparatus which is characterized by relatively low pressure drop between the inlet and discharge openings, and which therefore will consume a minimum amount of power in its operation.

Another object is to provide a method and apparatus that is applicable to a variety of uses where thorough intermixing of a gas and a treatment liquor is desired, as for example for gas scrubbing, quenching, absorption, heat exchnage, chemical reactions and the like.

Another object of the invention is to provide apparatus of the above character which is relatively inexpensive to construct and which avoids use of such conventional expendients as screens, grids, louvers, baffles and the like.

In general the present method involves the steps of dividing a stream of gas into at least two streams directed along paths which are first diverging and then converging. The two converging streams are brought together at the apex of the converging streams are brought together at the zone. A scrubbing liquor is introduced into the two streams before they are intermingled, whereby in the mixing zone the liquor is thoroughly intermixed with the gas. Preferably the gas is successively subjected to two or more such stages of scrubbing. The apparatus consist of casing means which is formed to provide the separate and intersecting flow paths of gas, and also to provide means for introducing the scrubbing liquor.

Additional objects and features of the invention will appear from the following description in which the preferred embodiment has been set forth in detail and in conjunction with the accompanying drawing.

BRIEF DESCRIPTION OF THE DRAWING

FIG. 1 is an elevation in section. Schematically illustrating apparatus incorporating the invention.

FIG. 2 is a side elevation of the apparatus shown in FIG. 1.

DESCRIPTION OF THE PREFERRED EMBODIMENT

The apparatus shown in FIGS. 1 and 2 consists of a sheet metal casing or housing 10 which has inlet and outlet openings 11 and 12 at its opposite ends. The inlet opening 11 is adapted to be connected to a duct which conveys the stream of gas for scrubbing treatment. In a typical instance the gas is discharged from a blower which is connected by a suitable duct to the opening 11. In other instances flow of air or other gas through the casing may be induced by connecting the outlet 12 to a suitable exhaust blower. The casing consists of front and back walls 13 and 14, together with the intervening duct forming walls shown in FIG. 1. The duct forming walls may for example include the exterior walls 16 and 18, together with the interior walls 17 and 19. Assuming that two scrubbing stages are employed, similar exterior duct forming walls 21 and 23 are provided, together with the interior duct forming walls 22 and 24. At the discharge end the walls 26 lead to the discharge opening.

As is clear from FIG. 1 the arrangement of duct forming walls is such as to form a plurality of diverging and converging flow passages. Thus the two flow passages 27 lead from the inlet opening 11 and are divergent. The passages merge with the passages 28, which are convergent. Passages 28 are also preferably of decreasing cross sectional flow area toward their converging end. In other words each of the two sets of walls 18 and 19 are converging. In the region 29 the two intersecting flow paths are merged in a turbulent mixing zone. Below the zone 29 the flow is again divided by the two passages 31 which are divergent, and which merge with the passages 32, which are again convergent. Here again the passages 32 are of decreasing cross sectional flow area toward their converging ends. A second mixing zone 33 is formed where the two flow paths intersect, and thereafter the flow continues through the passageway 34 to the outlet opening 12.

Water or other suitable liquor is sprayed into the apparatus in such a manner as to be entrained in each of the separated flow paths. Thus for the first stage a spray pipe 36 is shown located at the apex between the walls 17, and for the second stage a similar spray pipe 37 is shown located at the apex of walls 22. The spray pipes are adapted to introduce sprays of liquor into the gas whereby droplets of such liquor are entrained and are relatively evenly distributed into the two flow streams. Baffles 38 and 39 may overlie the spray nozzles to facilitate distribution of the liquor droplets into the two streams.

To describe the present method and operation of the apparatus illustrated in the drawing, it will be assumed that the method is carried out for the purpose of scrubbing air to remove dust and like solid particles. Also is assumed that the inlet opening 11 is connected by a suitable duct to the discharged side of an air blower, and that the outlet opening 12 is connected to a filter or so called eliminator, which in turn discharges the treated air to atmosphere or to any other point where it is desired. The flow velocity through the apparatus can be adjusted in accordance with requirements and to secure optimum efficiency. In general the flow velocity should be such as to develop intense turbulence and mixing action in the zones 29 and 33. Intense turbulence and mixing action is developed by virtue of impingement of the intersecting gas streams on each other. Also it is intensified by the flow velocities imparted to the separate air streams because of the shaping of the passages 28 and 32, that is because these passages are of decreasing cross sectional flow area. Water or other liquor is sprayed into the equipment by way of pipes 36 and 37 and is distributed in the form of droplets in the two streams flowing through the passages 27 and 28 for the first stage and passages 31 and 32 for the second stage.

In the mixing zones 29 and 30 the intense turbulence and mixing action causes effective scrubbing action between the liquor droplets and the gas.

Eventually the treated gas together with wet solid particles and remaining liquid droplets, pass out through the discharge opening 12 and through a filter or eliminator where the remaining liquid droplets and the wet solid particles are separated from the clean gas.

It will be evident that in addition to adjusting the gas flow velocity for optimum scrubbing action, the amount of scrubbing liquid introduced by way of pipes 36 and 37 can be adjusted whereby it is adequate to provide the desired treatment of the gas.

By way of example the flow velocity of the gas streams being discharged into the intermixing zones 29 and 33 may be of the order of 180 to 500 feet per second.

It will be evident from the foregoing that the present invention provides an efficient method for the scrubbing or other treatment of air and other gases. Efficient scrubbing action is made possible by the relatively intense turbulence and mixing action in the zones 29 and 33. Because of the efficient scrubbing action the size of equipment can be relatively small for a given flow capacity. The pressure drop across the apparatus is relatively low, due to the absence of screens, grids, baffles, louvers and the like, thus making the apparatus economical with respect to power consumption. Also the apparatus is relatively free of accumulations of solid material, and therefore it is not subject to clogging and need not be frequently shut down for cleaning.

What is claimed is:

1. A gas scrubbing method comprising the steps of dividing a flowing stream of gas to be treated into two separate and substantially unobstructed streams directed along separate paths having axes that are first diverging and then converging, progressively increasing the flow velocity in the converging stream portions by confining said converging stream portions to substantially linear paths of progressively decreasing section, intermingling the two converging streams with turbulence in a mixing zone located at the apex of the converging streams, and continuously spraying a scrubbing liquor into the upstream side of said zone.

2. A gas scrubbing method comprising the steps of dividing a flowing stream of gas to be treated into two separate substantially unobstructed streams directed along substantially linear paths having their axes diverging and then converging, causing the converging portions of the paths to gradually decrease in cross-sectional area whereby the streams increase in flow velocity, discharging the two streams into a common mixing zone where the streams converge and are intermingled with turbulence, continuously spraying a scrubbing liquid into the upstream side of said zone, causing gas flowing from said zone to again be divided into at least two separate streams that are substantially unobstructed, causing said last streams to be directed along paths having their axes first diverging and then converging, progressively increasing the flow velocity in the converging portions of said last named streams by confining said converging streams to substantially linear paths of progressively decreasing section, causing the converging portions of said last named streams to intersect and intermingle with turbulence in a second mixing zone, and continuously spraying scrubbing liquid into the upstream side of said second mixing zone.

3. Gas scrubbing apparatus comprising a casing having spaced inlet and discharge openings and including walls forming a plurality of connected flow passages and a mixing zone, the passages being substantially unobstructed and including two substantially linear passages which communicate with the inlet opening and which have divergent axes, said wall means defining two substantially linear passages which connect with the first named passages and which have convergent axes and are connected with the mixing zone whereby their axes intersect within the zone, the last named passages having gradually decreasing cross-sectional flow areas to effect an increase in flow velocities, whereby gas flowing through the same is delivered at high velocity into the mixing zone on intersecting axes to cause turbulent mixing action, and means for spraying scrubbing liquor into the upstream side of the mixing zone, the discharge opening being in communication with the downstream side of the mixing zone.

References Cited

UNITED STATES PATENTS

| 943,422 | 12/1909 | Knoepfel | 261—3 |
|---|---|---|---|
| 2,385,077 | 9/1945 | Harker et al. | 261—118 |
| 2,922,490 | 1/1960 | Old et al. | 55—94 |
| 3,347,024 | 10/1967 | Dock et al. | 55—241 |

REUBEN FRIEDMAN, Primary Examiner

R. W. BURKS, Assistant Examiner

U.S. Cl. X.R.

55—260; 261—116